United States Patent
Buehler

[11] Patent Number: 6,135,412
[45] Date of Patent: Oct. 24, 2000

[54] UNIVERSAL SEAT ASSEMBLY FOR GARDEN TRACTOR

[76] Inventor: Richard B. Buehler, 15777 Lucas-Geib Rd., Anna, Ohio 45302

[21] Appl. No.: 09/310,647
[22] Filed: May 12, 1999
[51] Int. Cl.[7] .............................. F16M 11/10; F16M 11/24
[52] U.S. Cl. ........................... 248/421; 248/419; 248/398
[58] Field of Search .................................. 248/421, 419, 248/429, 371, 372.1, 398

[56] References Cited

U.S. PATENT DOCUMENTS

| | | | |
|---|---|---|---|
| 2,534,386 | 12/1950 | Stewart | 248/371 |
| 3,198,473 | 8/1965 | Holz | 248/419 |
| 3,826,457 | 7/1974 | Huot de Longchamp | 248/421 |
| 4,029,284 | 6/1977 | Swenson | 248/421 |
| 4,667,917 | 5/1987 | Takace | 248/398 |
| 4,767,157 | 8/1988 | Kazaoka et al. | 248/421 |
| 4,813,643 | 3/1989 | Nihei | 248/419 |
| 4,941,641 | 7/1990 | Granzow et al. | 248/421 |
| 5,052,751 | 10/1991 | Hayakawa et al. | 248/429 |
| 5,154,402 | 10/1992 | Hill et al. | 248/429 |
| 5,169,112 | 12/1992 | Boyles et al. | 248/421 |
| 5,372,347 | 12/1994 | Minnich | 248/371 |
| 5,388,801 | 2/1995 | Edrich et al. | 248/421 |
| 5,445,353 | 8/1995 | Sakamoto | 248/371 |
| 5,800,016 | 9/1998 | Allred | 248/421 |
| 5,806,824 | 9/1998 | Isomura et al. | 248/421 |
| 5,924,668 | 7/1999 | Garrido | 248/419 |
| 5,927,679 | 7/1999 | Hill | 248/421 |
| 5,950,977 | 9/1999 | Proksch et al. | 248/421 |

*Primary Examiner*—Ramon O. Ramirez
*Assistant Examiner*—Jon A Szumny
*Attorney, Agent, or Firm*—Dale J. Rean

[57] ABSTRACT

A seat assembly for vehicles such as lawn and garden tractors comprises a base for attachment to the vehicle. The base includes an axle to which a first support plate is pivotally mounted. The first support plate includes a pair of channels. A corresponding pair of runners may be slidably attached to the channels in relative back and forth movement. A second support plate is attached to the runners and is movable therewith. A seat is pivotally attached to a third support plate. An air spring is mounted between the second and third support plates for restricting the movement of the second and third plates toward one another. A pair of struts extend between the second and third support plates for providing relative up and down movement therebetween as the air spring is compressed or expanded during use.

18 Claims, 4 Drawing Sheets

UNIVERSAL SEAT ASSEMBLY FOR GARDEN TRACTOR

BACKGROUND OF THE INVENTION

This invention relates generally to cushioned seat assemblies and, more particularly, to a seat assembly cushioned by an air spring for use with most types of garden tractors.

Various seat assemblies have been proposed for cushioning the ride of garden tractors or other similar vehicles. Although assumably effective in operation, the known vehicle assemblies are either not adapted for attachment to the various constructions of garden tractors or do not provide for easy adjustment of the firmness of the cushion.

Therefore, it is desirable to have a seat assembly that is universally adapted for attachment and use with different styles of garden tractors. It is further desirable to have a seat assembly which provides a cushioned ride according to a user selected level of firmness.

SUMMARY OF THE INVENTION

In response thereto, I have invented a seat assembly for lawn and garden tractors having a mounting bracket for mounting the assembly to a vehicle such as a lawn tractor. The bracket includes an axle for pivotally mounting a first support plate to the bracket. A pair of flanged channels extend upwardly from the first support plate. A pair of runners extend downwardly from a second support plate and are configured to slidably receive the flanges of the channels. Thus, the second support plate is slidable between user-selected frontward and backward positions. A lever is pivotally coupled to a runner and extends therethrough to selectively mate with a plurality of notches along a channel for holding the runner in a selected position relative to the channel.

A seat is pivotally attached to a third support plate. An air spring is mounted between the second and third support plates for restricting the movement of the second and third plates toward one another, such as by the weight of a user on the seat. A pair of scissors-like struts extend between the second and third support plates which allow the third support plate to move up and down according to the amount of weight placed on the seat and shocks encountered during use.

It is therefore a general object of this invention to provide a seat assembly which can be attached to the deck of different types of garden tractors.

Another object of this invention is to provide a seat assembly, as aforesaid, which is adjustable to a desired forward or rearward position.

A further object of this invention is to provide a seat assembly, as aforesaid, which can be pivoted forward to access an area beneath the seat assembly.

Still another object of this invention is to provide a seat assembly, as aforesaid, having an air spring which cushions a user's ride according to a selected degree of firmness.

Yet another object of this invention is to provide a seat assembly, as aforesaid, in which the firmness of the air spring can be adjusted before or during use of the garden tractor.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
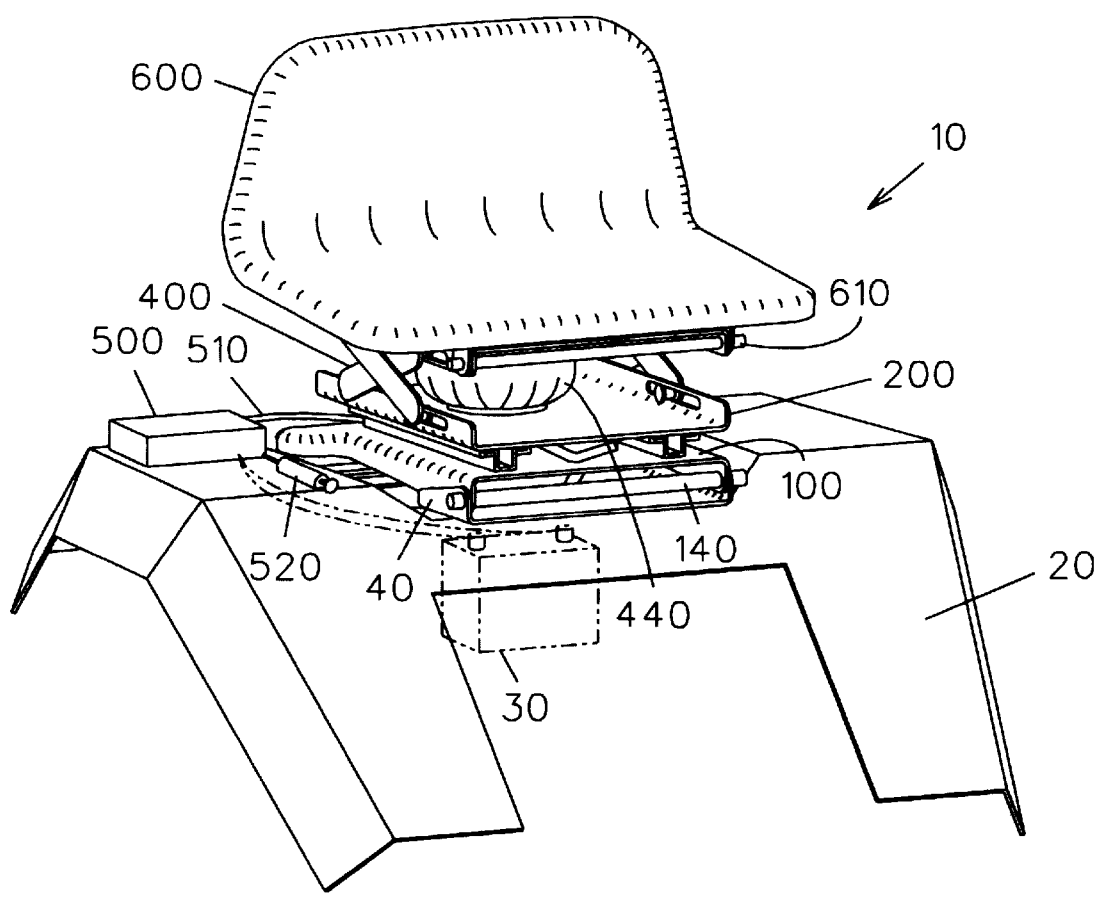
FIG. 1 is a front perspective view of the seat assembly mounted to the deck of a garden tractor according to the present invention.

Turning more particularly to the drawings, FIG. 1 shows the seat assembly 10 mounted to the deck 20 of a lawn or garden tractor. The seat assembly 10 includes a mounting bracket 40 fixedly and securely attached to a front portion of the deck 20 of the tractor. A first support plate 100 includes an upper surface 110 having a pair of oppositely disposed side walls 120 and a rear wall 130 extending downwardly therefrom. The mounting bracket 40 includes an axle 140 extending through apertures 141 in the first support plate 100 so as to pivotally couple the first plate 100 thereto. Thus the entire seat assembly 10 may be pivoted forward to allow access to an area therebelow.

Figure 2:
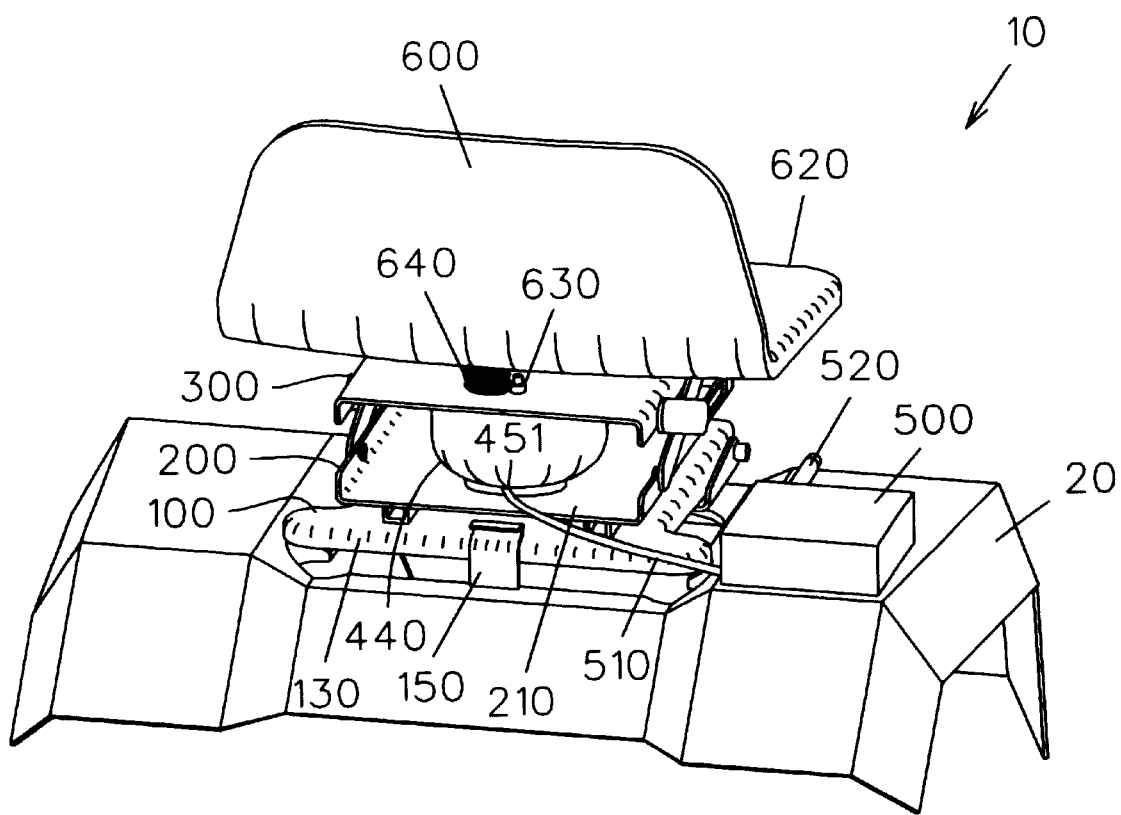
FIG. 2 is a rear perspective view of the seat assembly of FIG. 1.

A spring steel latch 150 is fixedly attached to the rear portion of the deck 20 for releasably holding the first plate 100 against the deck 20 (FIG. 2). The latch 150 may be displaced by a user to allow the seat assembly 10 to be pivoted forward about the axle 140 of the mounting bracket 40, such as when access to a battery 30 housed within a space beneath the seat assembly 10 is desired. It is understood that the latch 150 may be used to permanently secure the seat assembly 10 to the deck 20 of garden tractors not having an interior space below the seat assembly 10.

Figure 3:
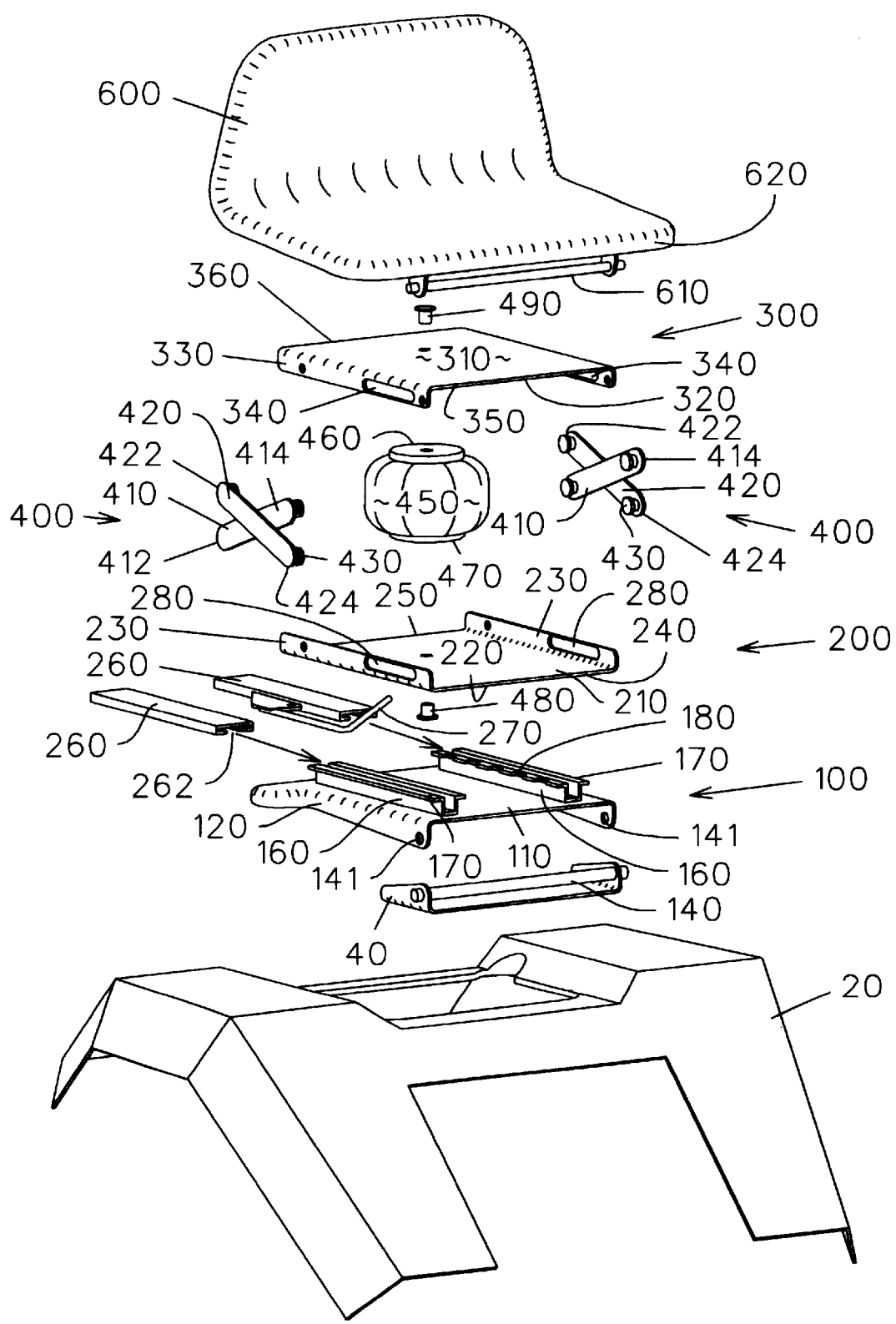
FIG. 3 is an exploded view of the seat assembly of FIG. 1.

A pair of spaced apart channels 160 extend upwardly from the upper surface 110 of the first plate 100 (FIG. 3). The channels 160 extend substantially the entire longitudinal extent of the first plate 100. Each channel 160 presents a generally U-shaped configuration having a pair of opposed flanges 170 extending outwardly therefrom.

The seat assembly 10 further includes a second support plate 200 having upper 210 and lower 220 surfaces. Side walls 230 extend upwardly from the upper surface 210 of the second plate 200. A pair of spaced apart runners 260 are fixedly attached to the lower surface 220 of the second plate 200 and longitudinally extend the length thereof. Each runner 260 forms a slot 262 extending therethrough particularly configured to receive the flanges 170 of a channel 160 therein. Thus, the second plate 200 may be slidably coupled to the first plate 100.

Figure 4:
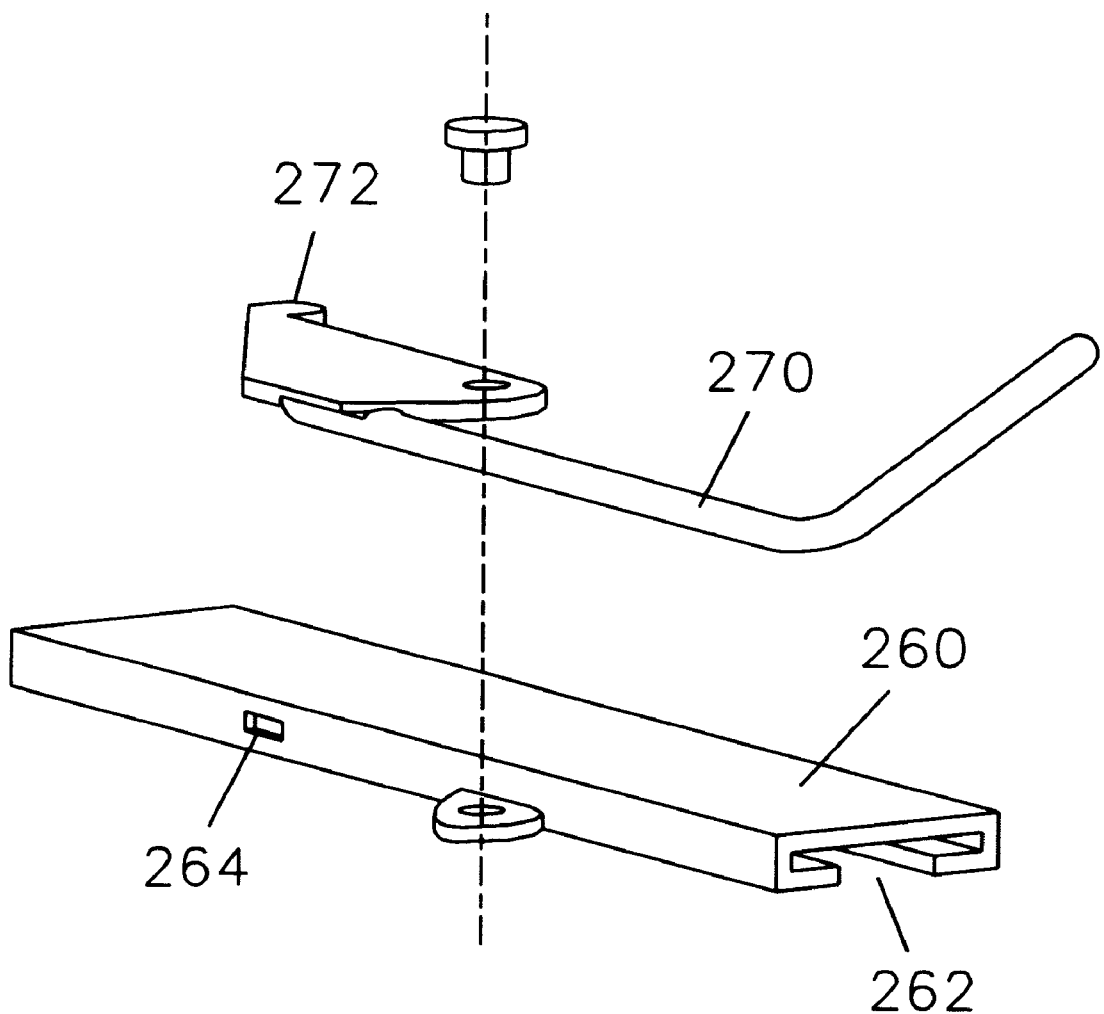
FIG. 4 is an exploded view of a runner assembly on an enlarged scale.

As shown in FIGS. 3 and 4 a lever 270 is pivotally attached to a runner 260. The lever 270 includes a flange 272 which extends through an aperture 264 in the runner 260 and into a user-selectable notch 180 in one flange 170 of a channel 160. A plurality of spaced apart notches 180 are formed in one flange 170 of a channel 160 such that front to back placement of the seat 600 can be maintained upon lever 270 placement in a selected notch by a user. It is understood that the second plate 200 may be completely removed from the first plate 100 if desired.

The seat assembly 10 includes a third support plate 300 having upper 310 and lower 320 surfaces. A pair of oppositely disposed side walls 330 extend downwardly from the lower surface 320. The side walls 230, 330 of second 200 and third 300 plates include slots 280, 340 therethrough. The slots 280, 340 extend rearwardly from points substantially adjacent front edges 240, 350 of the second 200 and third 300 plates, respectively.

A pair of oppositely disposed scissors-like struts 400 couple the second plate 200 to the third plate 300 (FIG. 3).

Each strut 400 comprises a first arm 410 and a second arm 420. First ends 412, 422 of first 410 and second 420 arms are pivotally coupled to side walls 230, 330 of second 200 and third 300 plates, respectively, substantially adjacent rear edges 250, 360 thereof. Second ends 414, 424 of first 410 and second 420 arms are slidably coupled to third 300 and second 200 plates with fasteners 430 which extend through slots 340, 280. Preferably, the struts 400 are coupled to second 200 and third 300 plates with bolts or other similar fasteners.

An air spring 440 is mounted between second 200 and third 300 plates for restricting the movement of the plates toward one another, thus cushioning a user's ride. The air spring 440 includes a bladder 450 constructed of a flexible, resilient material sandwiched between rigid upper 460 and lower 470 ends. The lower end 470 of the air spring 440 is fixedly attached to the upper surface 210 of the second plate 200 with a bolt 480 while the upper end 460 thereof is fixedly attached to the lower surface 320 of the third plate 300 with a bolt 490. The air spring 440 may be selectively inflated using an air compressor 500 coupled thereto with a hose 510. The compressor 500 may be fixedly attached to the deck 20 of the lawn tractor so that the volume of air within the air spring 440 may be regulated during use of the lawn tractor. The compressor 500 is activated by a switch 520. Bladder 450 may also be inflated by a separate pressurized air source coupled to a bladder valve 451.

A seat 600 having an axle 610 adjacent its front edge 620 is pivotally mounted to the third plate 300. The seat 600 can therefore be pivoted forward about the axle 610 to provide access to an emergency kill switch 630 and to the air spring 440. A coil spring 640 is attached to the underside of the seat 600 to provide additional cushion to a user sitting thereon.

In function, the seat assembly 10 can be universally attached to vehicles such as lawn and garden tractors. For tractors having a battery or storage compartment beneath the seat, the seat assembly 10 can be pivoted forward about the base axle 140. The seat assembly 10 can be permanently attached to the deck 20 of the tractor for tractors not having such a compartment. The channels 160 and runners 260 attached to the first 100 and second 200 plates, respectively, allow the seat assembly 10 to be adjusted back and forth to a desired position as desired by users of different sizes.

The air spring 440 is positioned between second 200 and third 300 plates for restricting the movement of the second 200 and third 300 plates toward one another. The flexible bladder 450 of the air spring 440 expands under the weight of a user and further expands when bumps or shocks are encountered during use. Correspondingly, the air pressure within the bladder 450 increases as the bladder 450 is increasingly compressed. Thus, the firmness of the seat is regulated by the volume of air in the air spring 440. The bladder 450 resiliently returns to its normal dimension when the seat 600 is no longer occupied by the user. As the air spring 440 contracts or expands during use, the struts 400 provide vertical movement of the third plate 300 relative to the second plate 200.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A seat assembly for a vehicle comprising:
   a base adapted for attachment to the vehicle;
   an axle on said base;
   a first support plate pivotally attached to said axle;
   a pair of channels on said first support plate;
   a runner for attachment to each channel;
   means for attaching said runner to each said channel in relative back and forth movement therealong;
   a second support plate attached to said runners in movement therewith;
   a third support plate;
   a seat;
   means for pivotally attaching said seat to said third support plate;
   means extending between said second and third support plates for providing relative up and down movement between said second and third plates; and
   a spring having a first end attached to said second support plate and a second end attached to said third support plate for restricting the movement of said second and third support plates one toward the other.

2. A seat assembly as claimed in claim 1, wherein said spring is an air spring further comprising:
   a flexible bladder between said first and second ends adapted to hold air under pressure therein, said bladder responsive to a weight of a user on said seat.

3. A seat assembly as claimed in claim 1, wherein said attaching means comprises:
   a pair of opposed flanges normal to each said channel and extending longitudinally therealong;
   each said runner forming a slot extending longitudinally therethrough, said slots adapted to slidably receive said flanges therein.

4. A seat assembly as claimed in claim 1, wherein said attaching means comprises:
   a pair of opposed flanges normal to each said channel and extending longitudinally therealong;
   each said runner forming a slot extending longitudinally therethrough, said slots adapted to slidably receive said flanges therein.

5. A seat assembly as claimed in claim 1 wherein said means for providing up and down movement between said second and third plates includes a first arm and a second arm disposed in a scissors-like configuration, said first arm having a lower first end pivotally coupled to said second plate with said second arm having an upper second end pivotally coupled to said third plate, said first arm having an opposed second end slidably coupled to said third plate with said second arm having an opposed first end slidably coupled to said second plate.

6. A seat assembly as claimed in claim 1, further comprising:
   a lever pivotally attached to one of said runners and presenting a free end; and
   one of said channels having a plurality of apertures therealong adapted to selectably receive said lever free end therein, said reception holding said runner in a user-selectable position relative to said channel.

7. A seat assembly as claimed in claim 3, further comprising:
   a lever pivotally attached to one of said runners and presenting a free end; and
   one of said flanges of one of said channels having a plurality of apertures therealong adapted to selectably receive said lever free end therein, said reception holding said runner in a user-selectable position relative to said channel.

8. A seat assembly as claimed in claim 1, further comprising:
   a lever pivotally attached to one of said runners and presenting a free end; and
   one of said flanges of one of said channels having a plurality of apertures therealong adapted to selectably receive said lever free end therein, said reception holding said runner in a user-selectable position relative to said channel.

9. A seat assembly as claimed in claim 1 further comprising:
   means on at least one of said runners for maintaining said runner at a selectable position relative to said associated channel.

10. A seat assembly for a vehicle comprising:
    a base adapted for attachment to the vehicle;
    a first support plate attached to said base;
    a pair of channels on said first support plate;
    a runner for attachment to each said channel in relative back and forth movement;
    a second support plate attached to said runners in movement therewith;
    a third support plate;
    a seat;
    means extending between said second and third support plates for providing relative up and down movement between said second and third support plates; and
    an air spring comprising:
      a first end attached to said second support plate;
      a second end attached to said third support plate; and
      a flexible bladder adapted to receive pressurized air therein said bladder for resisting the movement of said second and third support plates one toward the other under the weight of a user on said seat.

11. A seat assembly as claimed in claim 10, wherein said attaching means comprises:
    a pair of opposed flanges normal to each said channel and extending longitudinally therealong;
    each said runner defining a slot extending longitudinally therethrough for slidably receiving said flanges therein.

12. A seat assembly as claimed in claim 10 wherein said means for providing up and down movement between said second and third plates includes a pair of first arm and second arms connected in a scissors-like configuration, said first and second arms having first ends pivotally coupled to said second and third plates, respectively, and opposed second ends slidably coupled to said third and second plates, respectively.

13. A seat assembly as claimed in claim 10, further comprising means on said at least one runner and engageable with said corresponding channel to maintain said runner at a selectable position along said channel.

14. A seat assembly as claimed in claim 13 wherin said maintaining means comprises:
    a lever pivotally attached to one of said runners;
    one of said channels having a plurality of apertures therealong adapted to selectably receive said lever therein for maintaining said runner in a user-selectable position relative to said channel.

15. A seat assembly as claimed in claim 11, further comprising:
    a lever pivotally attached to one of said runners; and
    one of said flanges of one of said channels having a plurality of notches therealong adapted to selectably receive said lever therein for maintaining said runner in a user-selectable position relative to said channel.

16. A seat assembly for a vehicle, comprising:
    a bracket adapted for attachment to the vehicle;
    a first support plate attached to said bracket;
    at least one channel on said first support plate;
    a pair of opposed flanges extending longitudinally along said at least one channel, one of said flanges having a plurality of spaced apart apertures;
    at least one runner for attachment to said at least one channel, said runner configured for slidably receiving said flanges of said channel therein;
    a lever attached to said at least one runner, said lever selectably engaging one of said apertures, said engagement selectably precluding movement of said at least one runner along said channel;
    a third support plate;
    a seat attached to said third support plate;
    means extending between said second and third support plates for providing relative up and down movement between said second and third support plates; and
    an air spring between said second and third support plates, said air spring comprising:
      a first end attached to said second support plate;
      a second end attached to said third support plate; and
      a flexible bladder between said first and second ends for holding air under pressure therein, said bladder resisting movement of said second plate towards said third support plate under the weight of a user on said seat.

17. A seat assembly as claimed in claim 16, further comprising an air compressor adapted for attachment to the vehicle and coupled to said air spring for regulating the volume of compressed air within said bladder.

18. A seat assembly as claimed in claim 16 wherein said means for providing up and down movement between said second and third plates includes at least a first arm and a second arm disposed in a scissors-like configuration, said first and second arms having first ends pivotally coupled to said second and third plates, respectively, and opposed second ends slidably coupled to said third and second plates, respectively.

* * * * *